UNITED STATES PATENT OFFICE.

HARRY A. RHODES, OF DENVER, COLORADO.

PROCESS OF SEPARATING GOLD AND SILVER OR OTHER PRECIOUS METALS FROM THEIR ORES.

SPECIFICATION forming part of Letters Patent No. 588,476, dated August 17, 1897.

Application filed February 1, 1897. Serial No. 621,478. (No specimens.)

*To all whom it may concern:*

Be it known that I, HARRY A. RHODES, a citizen of the United States, residing at Denver, in the county of Arapahoe and State of Colorado, have invented certain new and useful Improvements in Processes of Separating Gold and Silver or other Precious Metals from their Ores or Compounds by the Action of Gaseous and Chemical Solvents Thereon; and I do hereby declare that the following is a full, clear, and exact description of the invention, which will enable others skilled in the art to which it appertains to make and use the same.

Heretofore ores, slimes, or compounds containing precious metals in a fine state of division have required to be finely ground in order to free the precious metals from their natural matrix. This matrix, consisting of the base matter of the ore salts, oxids, &c., is difficult of permeation by the solutions of potassium cyanid, bromin, chlorin gas, and other solvents used in these processes. Thus by failure to bring the solvent in contact with the precious metals losses by reason of such failure are sustained amounting to at least from two to fifty per cent. of the assay value. When, however, the ores, slimes, or compounds having the necessary fineness in powdered form are immersed in cyanid solutions or other liquid, a separation of the finer from the coarser matter is effected in the order of their relative gravities, the lighter particles being at the top. The resulting mass is difficult and impossible of rapid permeation and percolation by the solution or solvent, and extraction of the solvent from the mass or pulp can only be partially effected, and that with difficulty, usually by washing the mass or pulp with dilute solutions followed by water, the liquid being decanted from the mass. Where the solvent is permitted to leach into the mass or pulp without agitation, the separation of the slimes from the coarser matter is with some classes of ores to a certain extent prevented, but at the expense of considerable time consumed by the liquid in leaching through the mass, the leaching rate being very slow, and large losses of solvents and precious metals are sustained from these causes.

The object of my invention is to prevent the sliming or puddling of the ore matter in the solvent and to enable the ore matter to be pulverized to a sufficient fineness to relieve all of the precious metal contained therein of its natural matrix without incurring the difficulties of percolation and sliming heretofore entailed by fine division of the ore and to provide for perfect and rapid percolation and penetration of the mass by the solvent by leaching or immersion therein and to bring each individual element of the precious metals into free and direct contact with the solvent and to provide for the rapid and certain withdrawal of the solution or solvent from the mass without dilution of the same by additional wash-waters, if so desired, and to control within any desired limits the quantity of ore matter contained within any given cubic content or volume of the solution or solvent.

To carry my invention into effect, I first take the finely divided or pulverized ore matter (whether reduced from quartz by grinding or rolling, mill-tailings, placer-dirt, slimes, and settlings) and mix the same thoroughly with powdered calcined gypsum, known also as "calcium sulfate," "plaster-of-paris," or "stucco." To this compound powder is added a sufficient quantity (usually about equal volume with the plaster) of water to set the mass in porous cast in a manner exactly similar to the process of making plaster casts, molds, &c., but having the ores, slimes, or compounds inclosed and contained within the mass mechanically entrapped therein. The mass thus formed after setting may, if desired, be broken into pieces of any desired magnitude from the size of a mustard-seed to pieces weighing several pounds. It may, however, (and I prefer it,) be tedded or broken into small pieces of irregular size and form while it is still moist and coincident with the time of setting the mass. Again, it may, however, be immersed in or leached by the solvent while in the form of plates, cubes, or blocks.

In making up a charge of the combined ore and plaster after dry mixing it may be flooded with water and allowed to stand without setting until required for use, when, if the free water be withdrawn, the mass will immediately set and the ore matter may be previously neutralized, as at present practiced. The mass thus formed is insoluble and very porous, being of a multicellular construction and having a great affinity for liquid solutions or compounds. Complete penetration by the solvent is rapidly effected, and in all cases the metals, if in a free state, are mechanically cleaned by the internal shearing and contraction of the mass in forming the cells, and thus any air or other coatings inclosing the metals are broken away and the metal, such as gold and silver, is brought into direct contact with the solvent. By this method the ore matter, considered aside from its inclosing plaster-matrix and as compared with the old process, is uniformly expanded through any desired volume or cubic content, depending upon the proportions or percentage of ore matter added to the plaster. Thus the metal values and the quantities of interfering elements—such as zinc, arsenic, antimony, &c.—are divided into and through a greater volume of solvent, consequently reducing the percentage of interfering element relatively to the solvent within any given content or volume in proportion to the degree of expansion.

Each individual particle of ore matter is held rigidly in a fixed position within the solvent. It cannot rise, settle, or otherwise vary its position therein unless as in the case of gold and silver, which are chemically dissolved by the solvent.

The prepared compound being clean, porous, and rigid offers excellent opportunity for the application of centrifugal force for the purpose of extracting the solvent or solution after leaching or immersion. The whole of the solution containing the dissolved metals can thus be immediately withdrawn from the charge and the use of wash-water avoided. The solution may, however, be withdrawn by any convenient method, such as siphon, gravity percolation, or decantation methods.

Having fully described my invention, what I claim, and desire to secure by Letters Patent, is—

1. In chemical processes for the separation of gold or other precious metals from their ores, slimes or compounds, the method of preparing the ores by adding thereto a self-hardening binding material and forming a porous and rigid mass of the compound whereby the precious metals contained therein are freely acted upon by the solvent, substantially as described.

2. In chemical processes for the separation of gold or other precious metals from their ores, slimes or compounds, the method of preparing the ores, slimes or compounds, in such a manner that the precious metals contained therein, are freely acted upon by the solvent, by inclosing or incorporating finely-divided ores, slimes or compounds, in a practically insoluble, permeable, porous matrix, having a multicellular construction formed, preferably, of calcined gypsum, (also known as "calcium sulfate," "plaster-of-paris" or "stucco") and water, in such proportions as to form with the inclosed ores, slimes or compounds, a mass having the rigid and porous properties of plaster casts, and capable of being broken into portions suitable for treatment by chemical process, substantially as described.

HARRY A. RHODES.

Witnesses:
GEORGE DEE,
LORIN S. WHITNEY.